H. A. CHRISTENSEN.
DIGGING MACHINE.
APPLICATION FILED SEPT. 6, 1916.

1,273,458.

Patented July 23, 1918.
3 SHEETS—SHEET 1.

INVENTOR:
Hans Albert Christensen
By Wm Wallace White
ATT'Y.

H. A. CHRISTENSEN.
DIGGING MACHINE.
APPLICATION FILED SEPT. 6, 1916.
1,273,458.
Patented July 23, 1918.
3 SHEETS—SHEET 2.
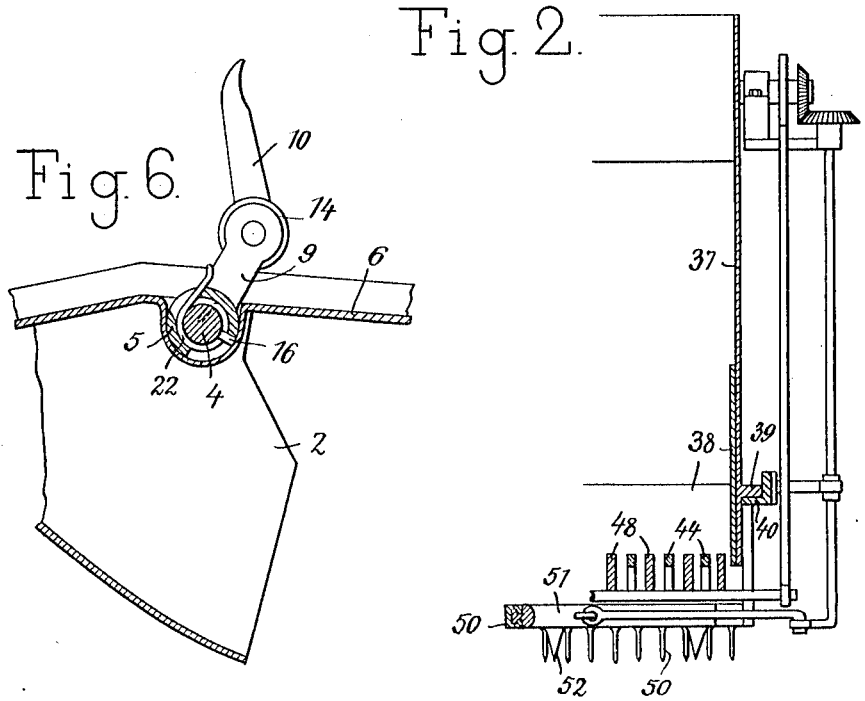
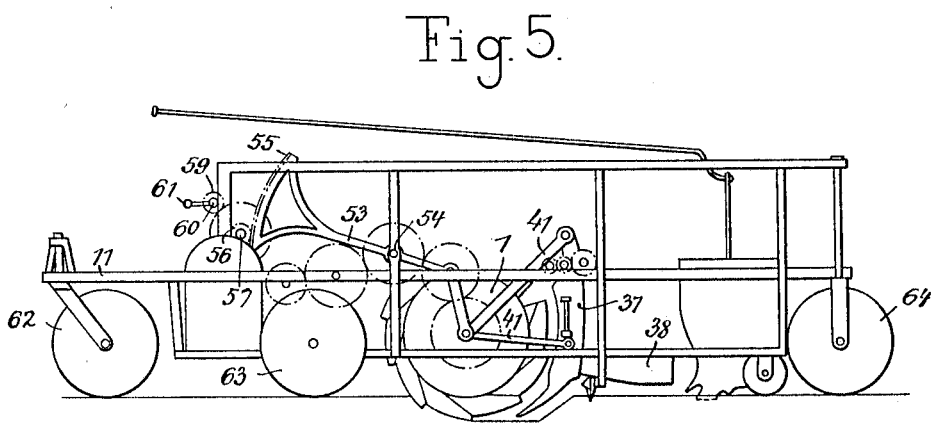
INVENTOR:
Hans Albert Christensen
By Wm Wallace White
ATTY.

H. A. CHRISTENSEN.
DIGGING MACHINE.
APPLICATION FILED SEPT. 6, 1916.
1,273,458.
Patented July 23, 1918.
3 SHEETS—SHEET 3.
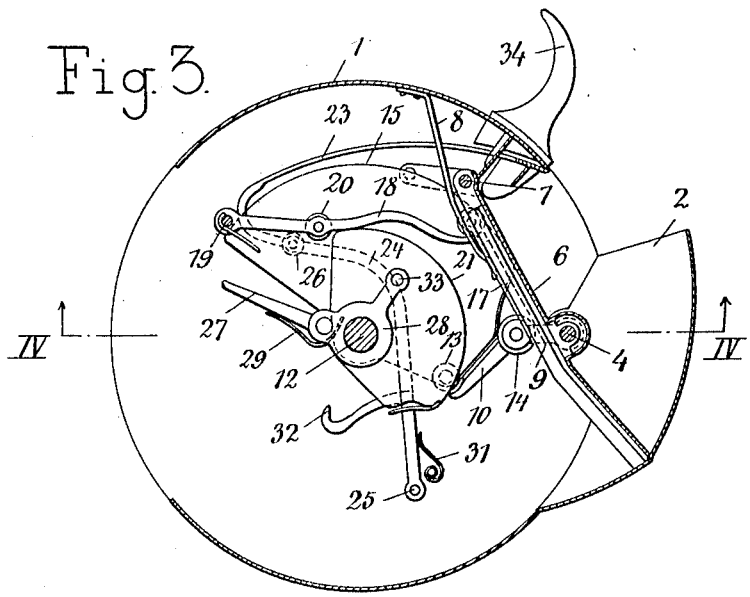
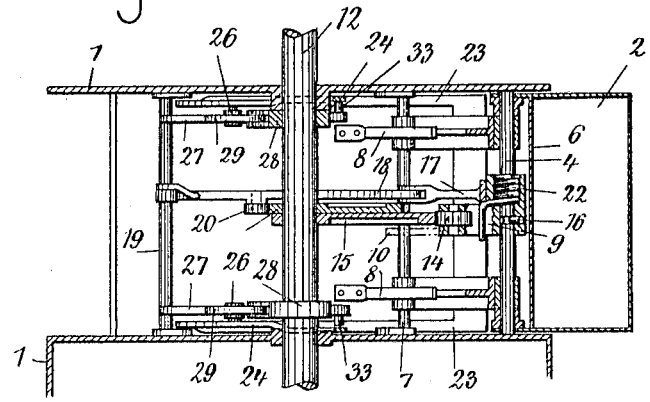
INVENTOR:
Hans Albert Christensen
By Wm Wallace White ATT'Y

UNITED STATES PATENT OFFICE.

HANS ALBERT CHRISTENSEN, OF HELLERUP, DENMARK.

DIGGING-MACHINE.

1,273,458.  Specification of Letters Patent.  Patented July 23, 1918.

Application filed September 6, 1916. Serial No. 118,655.

*To all whom it may concern:*

Be it known that I, HANS ALBERT CHRISTENSEN, master joiner, a subject of the King of Denmark, residing at Hellerup, in the Kingdom of Denmark, have invented new and useful Improvements in Digging-Machines, of which the following is a specification.

My invention refers to a digging machine for tilling the ground and consists of a rotating drum on which there are disposed shovels which dig into the earth from above in front of the machine and carry the earth dug up with them under the drum and throw it out behind the machine in such a manner that the earth which lay uppermost will lie undermost.

According to my invention the shovels are disposed so that they swing automatically when the earth is to be thrown out into the box disposed behind the drum. Furthermore, the shovels are closed at the sides with stationary walls and at the back by a plate to which the shovel is hinged. This plate is so fastened that it can be tilted into the drum together with the digging tool when the latter meets an obstacle which exceeds a certain degree, in order to prevent the shovel from being damaged. In front of the shovels there are disposed on the periphery of the drum crooked forks which, as the drum turns around, are forced down into the earth, loosening and removing any stones which may be present therein. When these forks have reached a position a little above the horizontal plane through the axis of the drum, fingers which are disposed on a rotating shaft running parallel to the shaft of the drum pass from below into the intermediate spaces between the forks, removing all larger stones which rest on the forks, and the stones are then thrown into the box disposed behind the drum. In the interior of the drum there is disposed a movable cleaner, which automatically comes forward and cleans the shovels when the earth has been thrown out. Such cleaning of the shovels is necessary when the machine is working in heavy clay soil or wet ground.

The box disposed behind the drum is divided into two parts, one of which is revoluble in bearings on the shaft of the drum, while the other is borne by the frame of the machine. The movable part of the box has two compartments, through which, respectively, the earth dug up by the shovels and the stones carried along by the forks disposed on the drum are thrown out in such a manner that the earth can pass through the grating in the bottom of the stationary part of the box, while the stones are collected at the back. In order that the dug-up earth may be divided as finely as possible, there are disposed, in the intermediate spaces between the stationary grating-bars of the box, movable grating-bars which, during the forward movement of the machine, are given a reciprocating, upward and downward movement, whereby the larger clods of earth are broken to pieces. Stones which accompany the earth, and which cannot pass through the grating are thrown back by the movable grating-bars into the back of the box. The final pulverization of the earth is accomplished by means of a rake disposed beneath the box, on which rake there is disposed a sliding member furnished with teeth, which latter are disposed in a smaller number than those of the rake.

The invention is set forth in the drawing.

Fig. 2 is a transverse section along the line II—II in Fig. 1.

Fig. 3 is a vertical section through the drum, a shovel being shown in another position as shown in Fig. 1.

Fig. 4 is a transverse section along the line IV—IV in Fig. 3.

Fig. 5 is a side view of the machine on a smaller scale, and

Fig. 6 is a detail of the shovels.

Figure 1:
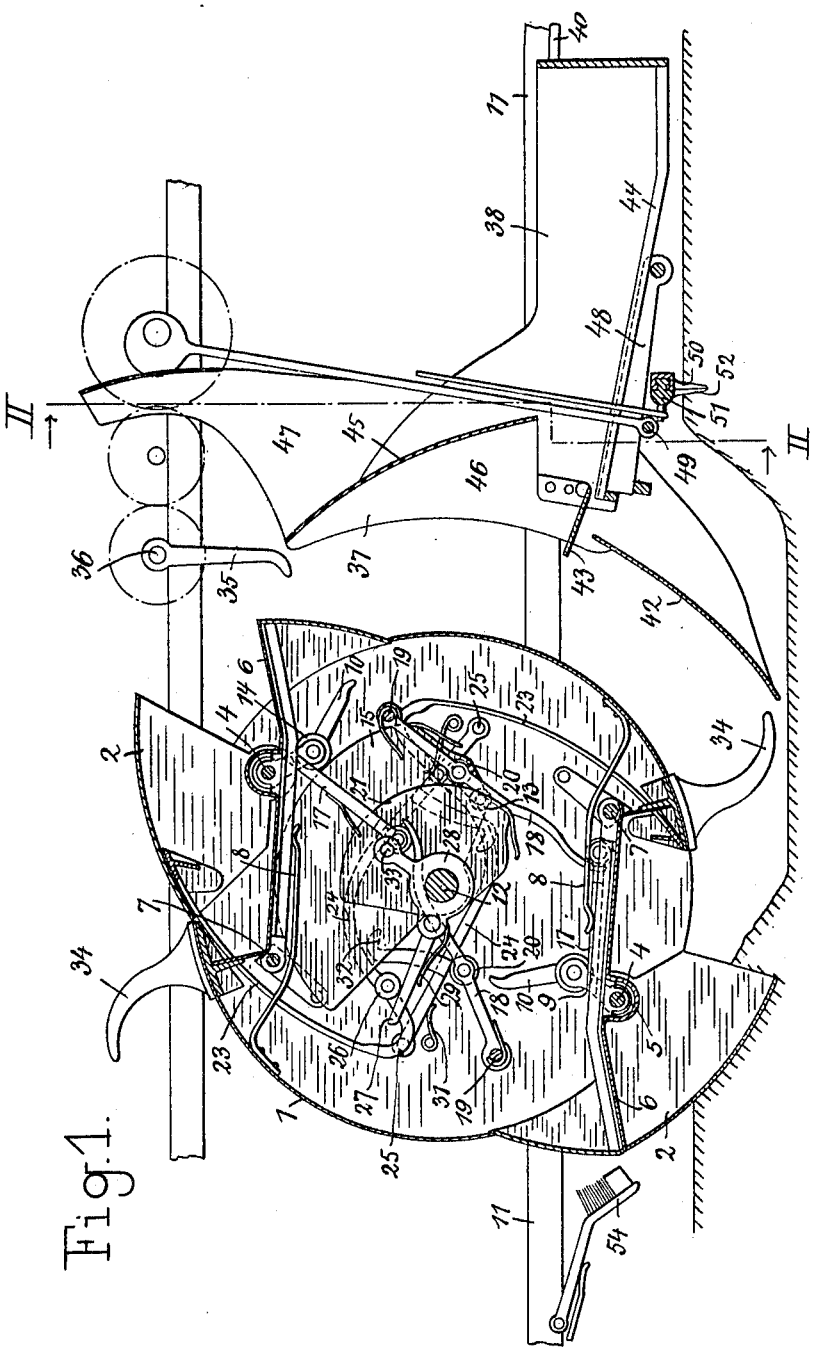
Figure 1 is a vertical section through a part of the machine.

1 is the digging drum, and 2 is the shovels, which may suitably be disposed in pairs diametrically opposite each other. A suitable number of shovels, for instance five pair, may be disposed on the drum, and the following shovel-pair in the longitudinal direction of the drum may then be displaced a little with relation to the foregoing pair, the displacement corresponding to one tenth of the circumference of the drum.

The shovels 2 are entirely closed at the sides by means of stationary walls 3, between which there is fastened a cross-bar 4 which serves as hinge-bolt for hinge-straps 5 on a plate 6, which covers the rear end of the shovel. The plate 6 is hinged to a shaft 7, which runs in bearings inside the drum, and it is actuated by a spring 8, which tends to hold the plate 6 (and thereby also the shovel) pressed forward in working position. If, while digging, the shovel meets a resistance which exceeds a certain degree, the plate 6 is turned around the shaft 7, so that it, together with the shovel, is tilted into the drum, until the shovel has passed over the obstacle. 9 is an arm which, by means of a hinge-strap, grasps around the rod 4 between the hinge-straps 5. The arm 9 has a dog 10 which, when the drum is turned around the shaft 12, fast disposed in the frame of the machine 11 or in a special supporting frame (Fig. 5), strikes against a roller 13, or some similar engaging member, which is secured with the shaft 12. When the dog 10 strikes against the roller 13, the arm 9 is turned, and then the shovel 2 begins to swing out from the digging position, and at the same time a roller 14, disposed on the side of the arm 9, strikes against an eccentric cam 15 on the shaft 12, whereby the shovel is swung so far out that the earth can slide out through its rear end, which is opened by the swinging of the shovel in relation to the plate 6.

As has already been said above, the arm 9 grasps around the rod 4 by means of a hinge-strap. The arm is, however, kept coupled together with the rod, for instance by a pin 16 (Fig. 6) inserted in it, and the pin 16 passes into a recess in the hinge strap, restricting the lateral turning of the arm 9 in relation to the shovel. 17 is an arm disposed on the arm 9, and it passes in under the end of a rod 18, which is revolubly fastened to a rod 19 secured to the end-walls of the compartment of the drum. The rod 18 carries on one side a roller 20. When the arm 9 is turned, after the roller 14 has struck against the cam 15, the rod 18 is pressed in toward the shaft 12 of the drum, but is pressed outward against the arm 17 when the roller 20, during the revolution of the drum, strikes against and slides on the edge of an eccentric cam 21 disposed on the shaft 12, whereby the arm 9 is held in the position shown at the bottom of Fig. 1, in which position the rear end of the shovel rests against the plate 6. Around the rod 4 there are placed spiral springs 22 (Fig. 6) whose ends are respectively fastened to the rod and are engaged behind the arm 9. The springs 22 are so powerful that they are not affected by the movements of the arm 9 and the shovel. They only serve as a safety device to prevent the tool from being damaged when the shovel is to be emptied, in case that an iron rod, or the like, should have happened to get stuck between the front end of the shovel 2 and the plate 6.

23 is a cleaner, which consists of a curved, U-shaped frame corresponding to the outer, curved surface of the shovel, which frame is supported by two arms 24, which are revolubly fastened to pins 25 on the drum. At their outer ends the arms 24 carry rollers 26 which, during the revolution of the drum, strike against the engaging member 27 on two collars 28 secured to the shaft 12, whereby the cleaner is swung into the shovel, so that its front edge can scrape the shovel-surface clean.

The engaging members 27 (Figs. 1 and 3) are revolubly disposed on the collars 28, but are backed by springs 29, which are sufficiently strong to hold up the engaging members when the cleaner is to be moved. If solid objects have got stuck in the shovel, the springs 29 yield, and the engaging members are turned so that the rollers 26 can slide up over the ends of the engaging members.

31 is a spring, which is fastened to the walls of the drum, and which carries the cleaner back after the cleaning is accomplished. If the cleaner should get stuck in the shovel, so that the springs 31 are not able to turn it back, hooks 32 on the arms 24 strike, during the revolution of the drum, against projections 33 on the fast cams 28, whereby the cleaner is forced out of the shovel. 34 are curved forks which, in suitable numbers and at suitable intervals, are disposed beside each other on the periphery of the drum in front of the shovels. During the revolution of the drum, the forks run down into the earth and remove any stones which may be hidden in the ground in the path of the shovel.

35 are fingers of suitable form disposed on a shaft 36 running in bearings in the frame 11 of the machine, parallel to the drum shaft 12, and rotating in an opposite direction to the drum. This shaft 36 turns four times during one revolution of the drum, and the length and shape of the fingers 35 are so adapted that the fingers, when the forks 34 have reached a position a little above the horizontal plane through the axis of the drum, pass from below up between the forks, lifting the stones which rest on them sufficiently to permit the ends of the forks, during the continued revolution of the drum, to escape the fingers and the stones now lying on the fingers. During the continued rotation of the shaft 36, the stones carried by the fingers are thrown down into the box disposed behind the drum.

The shaft 36 may suitably be elastic in relation to the driving member, for instance the cog-wheel, disposed on it, or the fingers 35 may be elastically disposed on the shaft 36, in that the supporting sleeve of every set of fingers corresponding to a set of forks may be actuated by a spiral spring wound around the shaft 36, so that the fingers may be compelled somewhat backward, in case a stone has got stuck so fast between the forks 34 that there might be danger of breaking the fingers. The latter may, however, also be connected by means of springs with the shaft, so that only the very finger which meets too strong an obstacle is forced back.

As shown in Fig. 1, a brush 54 may be disposed on the machine frame, which brush cleans the shovel-surface on the outside.

The box disposed behind the drum 1 consists of a forward and upper part 37, which is revoluble in bearings around the shaft 12, and a lower part 38 supported by the machine frame 11, in that it rests on the part 40 (Fig. 2) of the frame formed of angle-iron, by means of cleats 39 or rollers, so that the part 38 of the box can be drawn out and adjusted in relation to the part 37 of the box.

The part 37 of the box rests on the machine frame 11 and has arms 41 (Fig. 5) which grasp around the shaft 12. The arms 41 may suitably be divided and the pieces be slidable along each other and be held together by means of springs, or the like, so that they can yield if this part of the box is exposed to a temporary pressure. The part 37 of the box has, at the bottom, a front wall 42, which may suitably serve as a screen for the stones lying on the forks 34, to prevent them from falling down into the furrow dug out behind the drum.

In case the edge of the front wall 42 strikes against a larger stone which the forks 34 have not been able to remove, the part 37 of the box is lifted, in that it is turned around the shaft 12. Above the front wall 42 there is disposed a turnable flap 43, which covers the intermediate space between the front wall 42 and a bottom grating 44 in the part 38 of the box, and which projects so far forward that it can prevent the earth from the shovels from falling down in front of the front plate 42. If there are stones lying on the forks 34, and these stones project so far forward that they press against the flap, the latter is lifted until the stones have passed, after which it falls down again of its own weight or actuated by a spring not shown in the drawing, which spring constantly tends to hold the flap down against the front plate 42. The part 37 of the box is divided into two compartments 46 and 47 by means of a wall 45 fastened to the part 38 of the box. Through the compartment 46 the earth thrown out from the shovels 2 falls down on to the grating 44, on which the clods are broken up by the grating bars 48, which are disposed in the intermediate spaces between the grating bars 44, and which, as the machine moves forward, are given a reciprocal motion up and down, turning around a common supporting shaft 49.

50 is a rake disposed transversely with relation to the machine, under the box 37, 38. On the rake there is disposed a sliding member 51, which carries teeth 52, which are disposed in smaller numbers than the rake teeth. As the machine moves forward, the sliding member 51 is given a reciprocating, backward and forward motion along the rake 50, so that the clods in the layer of earth can be broken up between the stationary and the movable teeth.

The rake 50 and the sliding member 51 may suitably be disposed on the frame 11 of the machine and be adjustable as to height.

As shown in Fig. 5, the digging drum 1 can be hung in levers 53, one on each side of the machine. As shown on the drawing the machine can for instance rest on five wheels, namely two forewheels 62, two middle-wheels 63, disposed immediately before the drum 1 and one hind-wheel 64. The forewheels are swung free, the middle wheels are driven from the drum or from the motor by means of cog-wheels or the like. The machine is directed by means of the hind-wheel. The levers are revoluble around bolts 54 having bearings in the machine frame, and at their front end they each have a toothed segment 55 in which there meshes a cog-wheel 56, which is stationarily disposed on a shaft 57, which also carries a cog-wheel 58, which meshes with a cog-wheel 59, on whose shaft 60 there is disposed a hand-crank 61, so that the drum can be lifted or lowered by turning the hand-crank.

The digging machine works in the following manner: During the revolution of the drum the forks 34 run down into the earth and cut the soil and remove any stones, which, when the forks have reached to a certain height over the soil, are removed by the rotating fingers 35 and are thrown down into the rear part 38 of the box.

The shovels 2 dig during the revolution of the drum down in the earth forward from above and are thus filled with earth as they are closed on all sides except in the front. The shovels are held in the digging position by the spring actuated rod 17, whose position by the spring actuated rod 17 runs on the edge of the segmental roller 20 runs on the edge of the segmental cam 21 during the digging and thereby presses the plate 6 against the rear end of the shovel. When, during the revolution of the drum, the shovel is lifted up over the soil, the shovel automatically is swung around the hinge-bolt 4, whereby the shovel is opened in the rear and the earth then is thrown out in part by its own weight and in part by the centrifugal force. The swinging of the shovel takes place, when the dog 10 strikes against the roller 13, whereby the shovel begins to swing out from the digging position. The swinging is completed when the roller 14 strikes against the foreside of the segmental cam 15 and runs on this until it reaches the edge of the said cam, then the shovel has been swung to the open position, in which it is held as long as the roller 14 runs on the edge of the cam 15.

While the shovel is held in the abovenamed position, it is cleaned inward by a cleaner 23, which is swung into the shovel when the rollers 26 strike against the engaging members 27. When the rollers 26 escape from the said engaging members, because the arms of the cleaner are pivoted to the drum eccentrically to the shaft of the drum, the cleaner is drawn back by means of the springs 31, eventually thereby, that the hooks 32 strike against the engaging members 33. When the cleaner is returned to its normal position, the roller 14 has reached the rear end of the cam 15 and the shovel again is swung back to the digging position, influenced by the rod 18, the roller 20 of which strikes against the runs on the edge of the segmental cam 21 on which it continues to run as long as the shovel shall be held in the digging position.

When the shovel is opened in the rear, the earth is, as stated above, thrown out and falls down through the compartment 46 of the box 37, 38 in the bottom grate on which it is broken up.

Having now particularly described and ascertained the nature of my said invention and in what manner the same is to be performed, I declare that what I claim is:

1. In a digging machine the combination with implements adapted to cut into the earth and shovels which dig down into the earth forward from above, of a rotating drum, the shovels being swingably connected with the drum, means for carrying the shovels to the digging position and securing them in the same, the shovels being closed on all sides during the digging except in front, means for swinging the shovels from the digging position to another position, whereby the shovels are automatically opened in the rear, when the earth is to be thrown out, and means for securing the shovels in the opened position.

2. In a digging machine the combination with implements adapted to cut into the earth and shovels which dig down into the earth forward from above, of a rotating drum, provided on the circumference with cut-outs for plates pivotally connected with the drum, means for holding the said plates against the circumference of the drum, the shovels being provided with fast side walls, these being hinged to the said plates, the latter being adapted to close the shovels at the rear during the digging, means for carrying the shovels in the digging position and securing them in the same, means for swinging the shovels from the digging position to a position in which the shovels are automatically opened in the rear, when the earth is to be thrown out, and means for securing the shovels in the opened position.

3. In a digging machine the combination with implements adapted to cut into the earth and shovels which dig down into the earth forward from above, of a rotating drum, provided at the circumference with plates pivotally connected with the drum, the shovels being hinged to the said plates, said plates being adapted to close the shovels in the rear during the digging, springs secured to the inner wall of the drum and adapted to hold the plates against the circumference of the drum, the springs being also adapted to yield when the shovel meets an obstacle which exceeds a certain degree, means for carrying the shovels in the digging position and securing them in the same, means for swinging the shovels from the digging position to another position, in which the shovels are automatically opened in the rear when the earth is to be thrown out, and means for securing the shovels in the opened position.

4. In a digging machine the combination with implements adapted to cut into the earth and shovels which dig down into the earth forward from above, of a rotating drum provided at the circumference with plates pivotally connected with the drum and being supported by springs, each shovel being hinged to one of the plates by means of a hinge bolt provided with an arm extending into the drum and carrying a rod adapted to coöperate with another rod pivotally connected with the drum and carrying a roller adapted to slide during that part of the revolution of the drum in which the shovel is to be held in the digging position on the edge of a segmental cam secured to the non-rotatable shaft of the drum, means for swinging the shovels from the digging position to another position, in which the shovels may be automatically opened in the rear when the earth is thrown out, and means for securing the shovels in the opened position.

5. In a digging machine the combination of implements adapted to cut into the earth and shovels which dig down into the earth forward from above, of a rotating drum provided at the circumference with plates pivotally connected with the drum and supported by springs, each shovel being hinged to one of the said plates by means of a hinge bolt provided with an arm extending into the drum and carrying a rod adapted to coöperate with another rod pivotally connected with the drum and carrying a roller adapted to slide during that part of the revolution of the drum in which the shovel is to be held in the digging position on the edge of a segmental cam secured to the non-rotatable shaft of the drum, the said arm being provided with a dog adapted to strike against a roller on the said segmental cam, when, during the revolution of the drum, the shovel is to be swung from the digging to the opened position, and means for securing the shovel in the opened position.

6. In a digging machine the combination with implements adapted to cut into the earth and shovels which dig down into the earth forward from above, of a rotating drum provided at the circumference with plates pivotally connected with the drum and being supported by springs, each shovel being hinged to one of the said plates by means of a hinge bolt provided with an arm extending into the drum and carrying a rod adapted to coöperate with another rod pivotally connected with the drum and carrying a roller adapted to slide during that part of the revolution of the drum in which the shovel is to be held in the digging position on the edge of a segmental cam secured to the non-rotatable shaft of the drum, the said arm being provided with a dog, adapted to strike against a roller on the said segmental cam, when during the revolution of the drum the shovel is to be swung from the digging to the opened position, the said arm further carrying a roller, adapted to strike against the curved fore-side of the said segmental cam, whereby the swinging of the shovel may be completed to roll on the edge of the segmental cam, whereby the shovel may be secured in the opened position.

7. In a digging machine the combination with implements adapted to cut into the earth and shovels which dig down into the earth forward from above, of a rotating drum provided at the circumference with plates pivotally connected with the drum and being supported by springs, each shovel being hinged to one of the said plates by means of a hinge bolt provided with an arm extending into the drum and carrying a rod adapted to coöperate with another rod pivotally connected with the drum and carrying a roller adapted to slide during that part of the revolution of the drum in which the shovel is to be held in the digging position on the edge of a segmental cam secured to the non-rotatable shaft of the drum, the said arm being provided with a dog, adapted to strike against a roller on the said segmental cam, when, during the revolution of the drum, the shovel is to be swung from the digging to the opened position, the said arm further carrying a roller, adapted to strike against the curved fore-side of the said segmental cam, whereby the swing of the shovels are completed to roll on the edge of the segmental cam, whereby the shovel may be secured in the opened position, and springy means connecting the said arm with the said hinge bolt.

8. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging except in front, means for swinging the shovels from the digging position to another position in which the shovels are automatically opened in the rear when the earth is to be thrown out, means for securing the shovels in the opened position, and a cleaner disposed in the drum and adapted to be swung forward and into the shovel when this is swung to the opened position.

9. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging except in front, means for swinging the shovels from the digging position to another position, in which the shovels are automatically opened in the rear when the earth is to be thrown out, means for securing the shovels in the opened position, a cleaner consisting of a U-shaped frame pivotally connected with the drum, means for swinging the cleaner forward into the shovel when standing in the opened position, and means for carrying the cleaner back.

10. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging except in front, means for swinging the shovels from the digging position to another position in which the shovels are automatically opened in the rear when the earth is to be thrown out, means for securing the shovels in the opened position, a cleaner consisting of a U-shaped frame pivotally connected with the drum, rollers disposed on the arms of the cleaner, the said rollers adapted during the revolution of the drum to coöperate with engaging members pivotally fastened to a cam secured to the shaft of the drum, whereby the cleaner is swung into the shovel, and means for carrying the cleaner back.

11. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging, except in front, means for swinging the shovels from the digging position to another position in which the shovels are automatically opened in the rear when the earth is to be thrown out, means for securing the shovels in the opened position, a cleaner consisting of a U-shaped frame pivotally connected with the drum, rollers disposed on the arms of the cleaner, the said rollers adapted during the revolution of the drum to coöperate with engaging members and pivotally disposed on a cam secured to the shaft of the drum and supported by springs, and means for carrying the cleaner back.

12. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging except in front, means for swinging the shovels from the digging position to another position in which the shovels are automatically opened in the rear when the earth is to be thrown out, means for securing the shovels in the opened position, a cleaner consisting of a U-shaped frame pivotally connected with the drum, rollers disposed on the arms of the cleaner, the said rollers adapted during the revolution of the drum to coöperate with engaging members, said rollers being pivotally disposed on a cam secured to the shaft of the drum and supported by springs, and springy members adapted to carry the cleaner back.

13. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging except in front, means for swinging the shovels from the digging position to another position in which the shovels are automatically opened in the rear when the earth is to be thrown out, means for securing the shovels in the opened position, a cleaner consisting of a U-shaped frame pivotally connected with the drum, rollers disposed on the arms of the cleaner, the said rollers adapted during the revolution of the drum to coöperate with engaging members, said rollers being pivotally disposed on a cam secured to the shaft of the drum and supported by springs, springy members adapted to carry the cleaner back, and hooks secured to the arms of the cleaner and adapted to coöperate with engaging members disposed on the latter cam.

14. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging except in front, means for swinging the shovels from the digging position to another position in which the shovels are automatically opened in the rear when the earth is to be thrown out, means for securing the shovels in the opened position, the implements adapted to cut down into the earth being secured to the drum in front of the shovels and adapted to coöperate with rotating implements disposed on the frame of the machine and adapted to be swung from below up between the said implements during the rotation, said implements being secured to the drum whereby stones taken along with the said implements are removed by the rotating implements.

15. In a digging machine the combination with implements adapted to cut into the earth and shovels which dig down into the earth forward from above, of a rotating drum, the shovels being swingably connected with the drum, means for carrying the shovels in the digging position and for securing them in the same, the shovels being closed on all sides during the digging except in front, means for swinging the shovels from the digging position to another position in which the shovels are automatically opened in the rear when the earth is to be thrown out, means for securing the shovels in the opened position, the implements adapted to cut down into the earth being secured to the drum in front of the shovels and adapted to coöperate with rotating implements disposed on the frame of the machine and adapted to be swung from below up between the said implements during the rotation, said implements being secured to the drum whereby stones taken along with the said implements are removed by the rotating implements, these implements consisting of fingers, yieldingly fastened on a rotating shaft.

In testimony whereof I have signed my name to this specification in the presence of two subscribing witnesses.

HANS ALBERT CHRISTENSEN.

Witnesses:
V. BELSCHNER,
T. ENGELHARDT MADSEN.